United States Patent
Kray et al.

(10) Patent No.: US 11,207,821 B2
(45) Date of Patent: Dec. 28, 2021

(54) METHOD OF MAKING 3D TUBE AND 3D TUBE MADE THEREBY

(71) Applicant: General Electric Company, Schenectady, NY (US)

(72) Inventors: Nicholas Joseph Kray, West Chester, OH (US); Wendy Wenling Lin, Evendale, OH (US); Arthur William Sibbach, Lynn, MA (US); Aaron Todd Sellinger, Evendale, OH (US)

(73) Assignee: General Electric Company, Schenectady, NY (US)

( * ) Notice: Subject to any disclaimer, the term of this patent is extended or adjusted under 35 U.S.C. 154(b) by 564 days.

(21) Appl. No.: 15/880,818

(22) Filed: Jan. 26, 2018

(65) Prior Publication Data
US 2019/0232547 A1    Aug. 1, 2019

(51) Int. Cl.
| | |
|---|---|
| *B29C 55/28* | (2006.01) |
| *B29C 53/08* | (2006.01) |
| *B29C 53/82* | (2006.01) |
| *B32B 1/08* | (2006.01) |
| B29L 23/00 | (2006.01) |
| B29K 101/12 | (2006.01) |
| B29C 53/84 | (2006.01) |

(52) U.S. Cl.
CPC .......... *B29C 55/285* (2013.01); *B29C 53/083* (2013.01); *B29C 53/82* (2013.01); *B32B 1/08* (2013.01); *B29C 53/84* (2013.01); B29K 2101/12 (2013.01); B29L 2023/22 (2013.01)

(58) Field of Classification Search
CPC ....... B29C 55/04; B29C 55/045; B29C 55/08; B29C 55/28; B29C 55/285; B32B 1/08
See application file for complete search history.

(56) References Cited

U.S. PATENT DOCUMENTS

| | | | |
|---|---|---|---|
| 6,896,841 B2 | 5/2005 | Velicki et al. | |
| 8,926,313 B2 | 1/2015 | Sana | |
| 9,138,942 B2 | 9/2015 | Drever | |
| 9,458,955 B2 | 10/2016 | Hammer et al. | |
| 9,694,540 B2 | 7/2017 | Trockel | |
| 2014/0027000 A1* | 1/2014 | Kiest, Jr. ............... | F16L 55/265 138/97 |
| 2014/0175689 A1* | 6/2014 | Mussig ................... | E21B 29/10 264/36.17 |

FOREIGN PATENT DOCUMENTS

WO    WO2008073976    *    6/2008    ............. F16L 55/16

* cited by examiner

*Primary Examiner* — Walter Aughenbaugh
(74) *Attorney, Agent, or Firm* — Dority & Manning, P.A.

(57) ABSTRACT

A method of making a 3D tube and the 3D tube made thereby. The method comprises: inserting a deflated pre-formed bladder into the 3D tube; and inflating the pre-formed bladder to deform the 3D tube and make the 3D tube have a substantially similar shape as that of the pre-formed bladder inflated.

14 Claims, 6 Drawing Sheets

Inserting a deflated pre-formed bladder into the 3D tube.

Inflating the deflated pre-formed bladder to deform the 3D tube and make the 3D tube have a substantially similar shape as that of the pre-formed bladder inflated.

FIG. 7

METHOD OF MAKING 3D TUBE AND 3D TUBE MADE THEREBY

TECHNICAL FIELD

The present invention generally relates to a method of making a tube, and, more particularly, to a method for making a 3D tube and the 3D tube made thereby.

BACKGROUND OF THE INVENTION

Currently, a 3D (three dimensional) tube is used in many applications, e.g., in an aircraft engine to guide gas or liquid. In many situations, the 3D tube is mainly made of metal, which results in a disadvantage of increasing weight. Moreover, the 3D tube may usually have an irregular shape to match up with the different applications, while the irregular shape is difficult to manufacture. Generally, buckling may appear in curved portions of the 3D tube, and thus may reduce the intensity and lifespan of the 3D tube.

Accordingly, a new method for making a 3D tube and an improved 3D tube would be necessary.

BRIEF DESCRIPTION OF THE INVENTION

Aspects and advantages of the invention will be set forth in part in the following description, or may be obvious from the description, or may be learned through practice of the invention.

One aspect of the invention relates to a method of making a 3D tube. The method comprises: inserting deflated pre-formed bladder into the 3D tube; and inflating the pre-formed bladder to deform the 3D tube and make the 3D tube have a substantially similar shape as that of the pre-formed bladder inflated.

Another aspect of the invention relates to a 3D tube. The 3D tube is manufactured by the method comprising: inserting a deflated pre-formed bladder into the 3D tube; and inflating the deflated pre-formed bladder to deform the 3D tube and make the 3D tube have a substantially similar shape as that of the pre-formed bladder inflated.

BRIEF DESCRIPTION OF THE DRAWINGS

More particular description of embodiments of the inventive subject matter briefly described above will be rendered by reference to specific embodiments thereof that are illustrated in the appended drawings. Understanding that these drawings are depicted only typical embodiments of the inventive subject matter and are not therefore to be considered to limit its scope, embodiments of the inventive subject matter will be described and explained with additional specificity and detail through the use of the accompanying drawings in which:

FIG. 7 is a flowchart of a method for making a 3D tube according to an exemplary embodiment of the present invention.

DESCRIPTION OF EMBODIMENTS OF THE INVENTION

Figure 1:
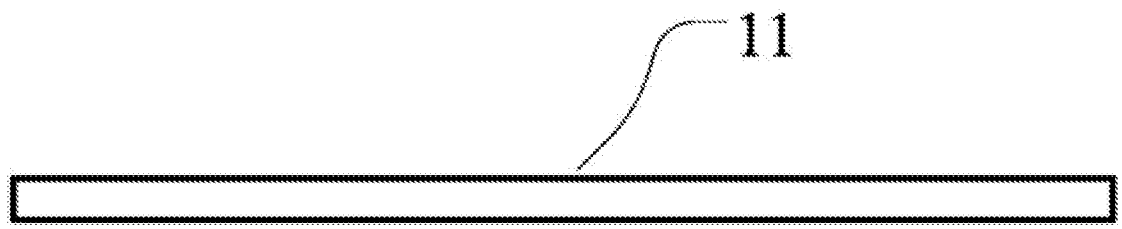
FIG. 1 is a schematic illustration of a 3D tube according to an exemplary embodiment of the present disclosure.

In the background and the following description, for the purposes of explanation, numerous specific details are set forth in order to provide a thorough understanding of the technology described herein. It will be evident to one skilled in the art, however, that the exemplary embodiments may be practiced without these specific details. In other instances, structures and devices are shown in diagram form in order to facilitate description of the exemplary embodiments.

The exemplary embodiments are described with reference to the drawings. These drawings illustrate certain details of specific embodiments that implement a module, method, or computer program product described herein. However, the drawings should not be construed as imposing any limitations that may be present in the drawings. In the drawings, like reference numerals are utilized to refer to like elements throughout the various embodiments depicted in the drawings.

Figure 2A:
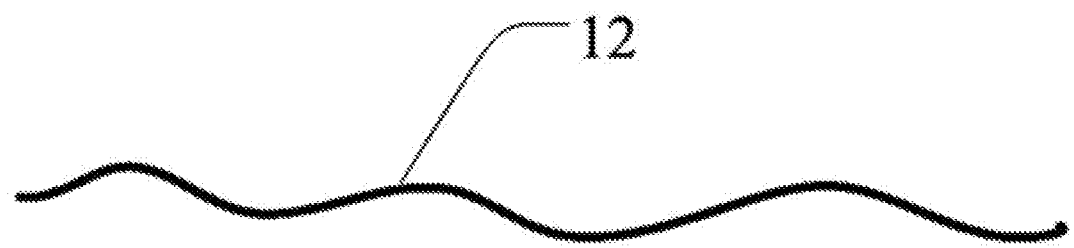
FIG. 2A and FIG. 2B are a deflated pre-formed bladder and an inflated pre-formed bladder, respectively, according to an exemplary embodiment of the present disclosure.
Figure 2B:
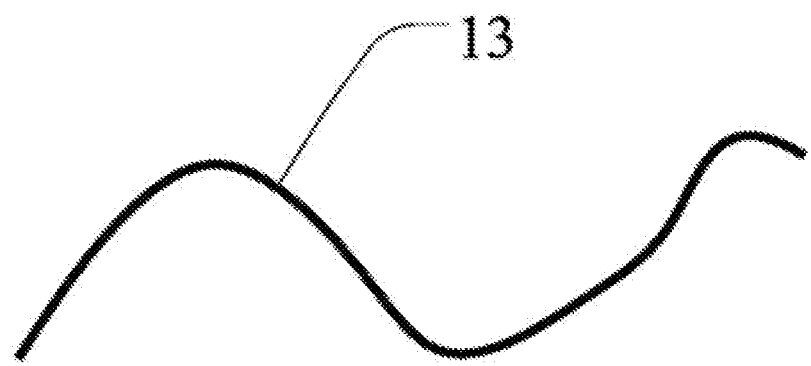

FIG. 1 schematically illustrates a 3D tube 11, and FIG. 2A and FIG. 2B illustrate a deflated pre-formed bladder 12 and an inflated pre-formed bladder 13, respectively, according to an exemplary embodiment of the present disclosure. The 3D tube 11 roughly has a linear shape. A cross-sectional shape of the 3D tube 11 may be circle, or any other suitable geometrical shapes, such as oval, rectangle, trapezoid, triangle, rhomboid, etc. In some exemplary embodiments, the 3D tube 11 may have a curved shape, or a combination of a linear shape and a curved shape. That is, the 3D tube may be formed with one curved portion, or with at least one liner portion and one curved portion. Furthermore, two opposite ends of the 3D tube 11 may have different geometrical shapes, for example, one end with a circle shape, and the other end with a rectangle shape.

In some embodiments, the 3D tube 11 is made of thermoplastic, such as polyethylene, polypropylene, polyetherketone, polyetheretherketone, polyetherketoneketone, polyetherimide, polysulfone, polyphenylsulfone, polyphenylenesulfone, or any other suitable materials. Comparing to a conventional metallic 3D tube, a thermoplastic 3D tube may be lighter, and therefore may reduce the weight of an apparatus with the 3D tube, e.g., a turbofan engine of an aircraft. Moreover, the thermoplastic 3D tube may have a lifespan of 20 years or more.

In some embodiments, the pre-formed bladders 12, 13 may be made of silicone, fluoroelastomer, fluorosilicone, nitrile rubber, EPDM, polyurethane, Teflon, etc., or any other suitable materials.

The pre-formed bladder 12 is deflated initially, as shown in FIG. 2A, defined as a deflated pre-formed bladder 12, and then is inflated. After being inflated, the pre-formed bladder 12 turns into an inflated pre-formed bladder 13, as shown in FIG. 2B. It may be observed that the inflated pre-formed bladder 13 presents a specific shape. Persons skilled in art may appreciate that the specific shape of the bladder 13 as shown in FIG. 1 is pre-designed and may be any other suitable shapes according to a desired requirement of an apparatus with the 3D tube. The pre-designed shape of the bladder 13 may be irregular or regular.

Figure 3:
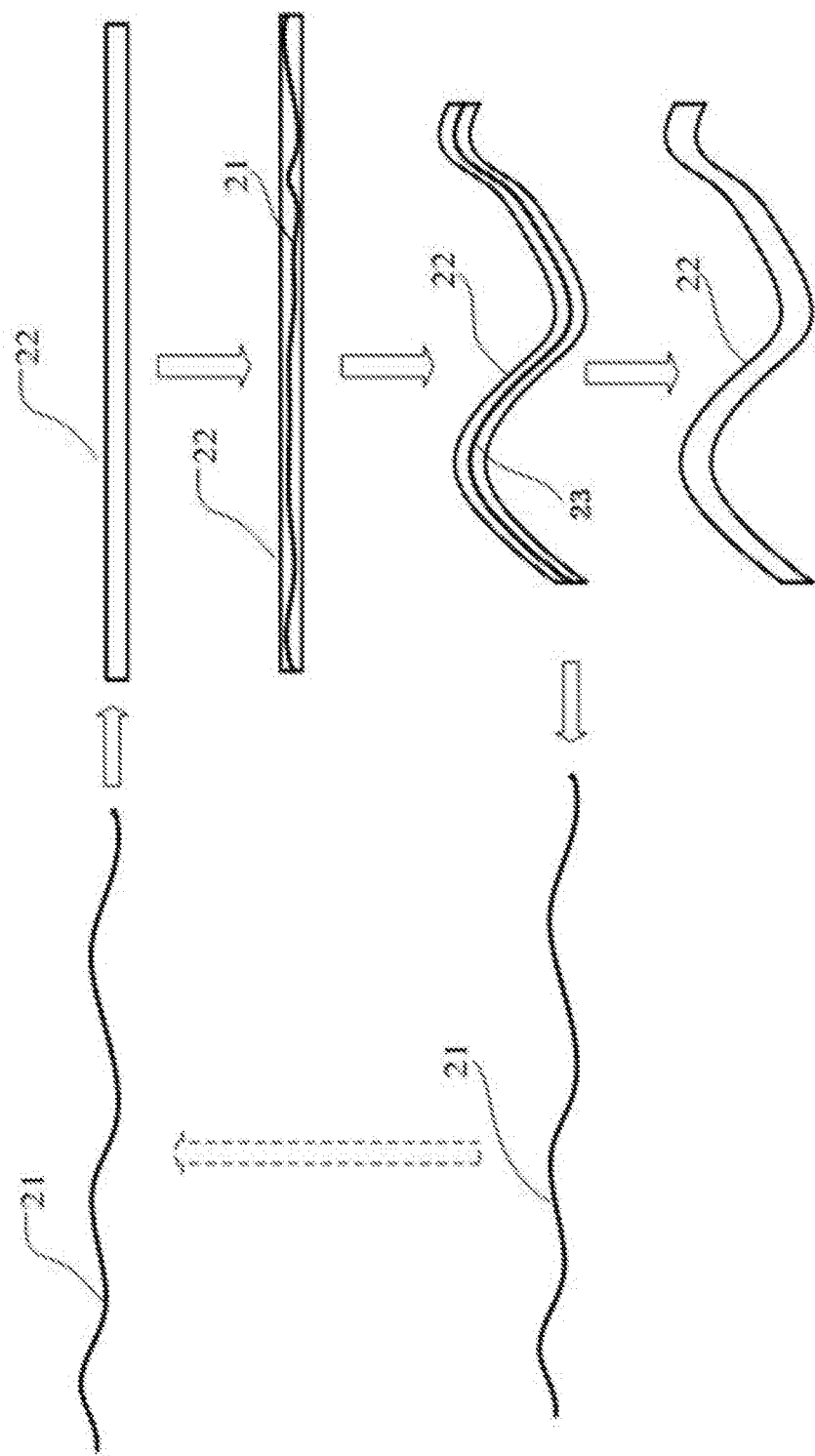
FIG. 3 is a schematic illustration of a manufacturing process of a 3D tube according to an exemplary embodiment of the present disclosure.

Turning to FIG. 3 and FIG. 7, FIG. 3 schematically illustrates a manufacturing process of the 3D tube according to an exemplary embodiment of the present disclosure, and FIG. 7 schematically illustrates a flowchart of a method for making a 3D tube according to an exemplary embodiment of the present invention. Firstly, a deflated pre-formed bladder 21 is inserted into a 3D tube 22 until the deflated pre-formed bladder 21 is fully received in the 3D tube 22. Secondly, the pre-formed bladder 21 in the 3D tube 22 is inflated to make the bladder 21 have a pre-designed shape. During the inflating process for the bladder 21, the deflated pre-formed bladder 21 turns into a continuous inflated pre-formed bladder 23 as shown in thereof. The air pressure intensity in the inflated pre-formed bladder 23 may range from 10 psi to 10000 psi. During the inflating process, the pre-formed bladder 23 exerts a force to the 3D tube 22 to make it deform and have a substantially similar shape as that of the inflated pre-formed bladder 23.

Figure 5:
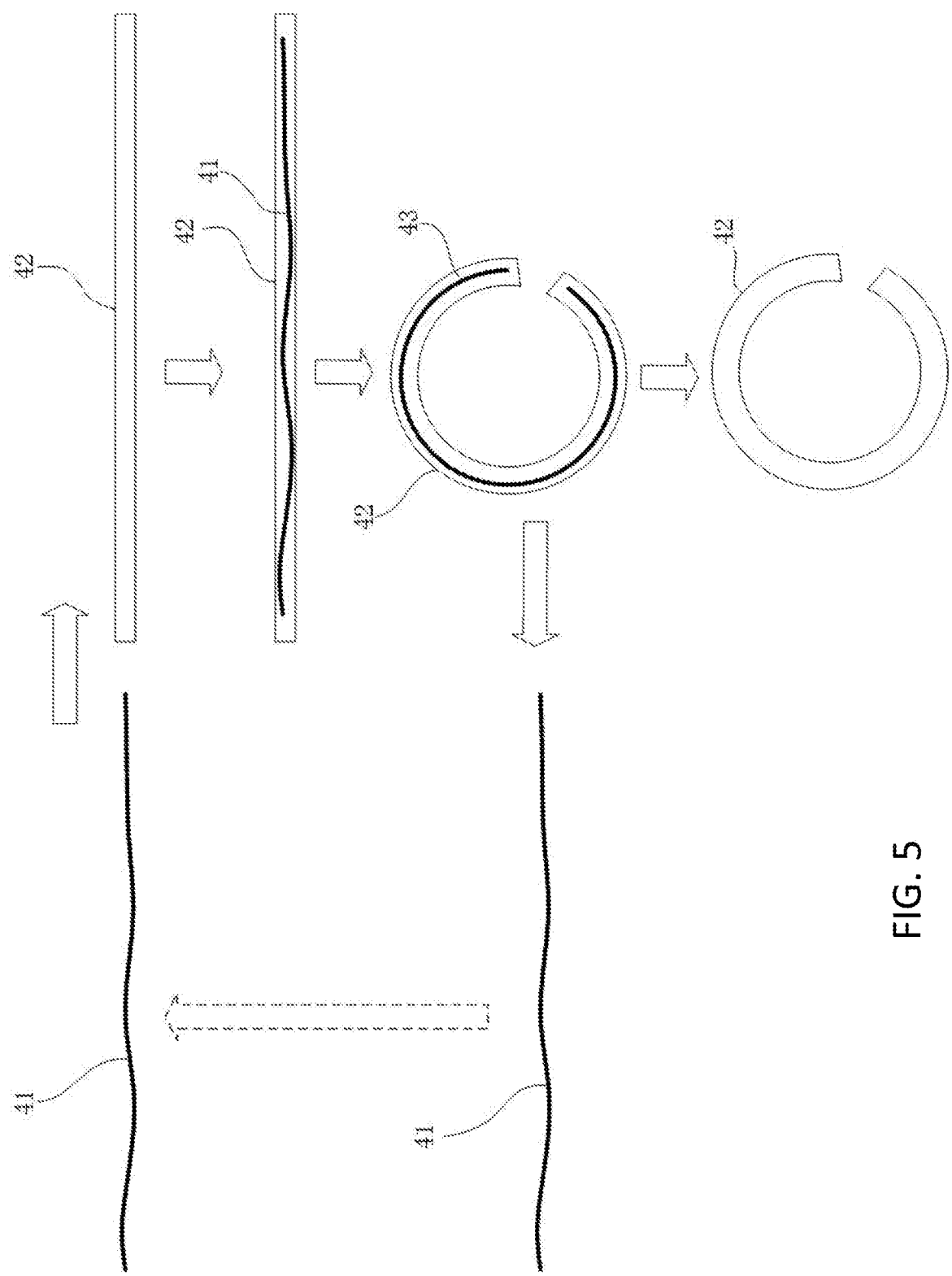
FIG. 5 is a schematic illustration of a manufacturing process of a 3D tube according to an exemplary embodiment of the present disclosure.

In some embodiments, the pre-designed shape of the bladder 21 is of a regular geometrical shape. As shown in FIG. 5, a deflated pre-formed bladder 41 is inserted into a 3D tube 42 until the deflated pre-formed bladder 41 is fully received in the 3D tube 42, and then the pre-formed bladder 41 is inflated to make it have a pre-designed shape. The pre-designed shape of the bladder 41 in some embodiments is substantially circle. During the inflating process, the deflated pre-formed bladder 41 turns into a circular bladder 43 and exerts a force to the linear-shaped 3D tube 42 continuously to make it deform and have a circular shape similar to the shape of the bladder 43 inflated. Although FIG. 5 only shows a continuous circular per-designed shape of the bladder 43, persons skilled in art may well appreciate that any other suitable regular geometrical shapes (such as oval, hyperbola, parabola, etc.) may be utilized according to detailed requirements of the 3D tube.

In some embodiments, after the inflating process, heat is applied to the 3D tube 22 for "reforming" the 3D tube 22. According to the specific thermoplastic materials of the 3D tube 22, the heating temperature to the 3D tube 22 may range from 100 F to 750 F. Specifically, the heating temperature usually will be slightly above the glass transition temperature or the crystallization temperature of the thermoplastic materials. As such, the thermoplastic materials may be crystallized, and therefore keep its shape. The pre-formed bladder 23 is received in the 3D tube 22 and kept inflated during the heating process, and thereby the pre-formed bladder 23 may keep the shape of the 3D tube 22 similar to that of the inflated pre-formed bladder 23 during the heating process.

After forming the 3D tube 22 with the similar shape as the inflated pre-formed bladder 23, the inflated pre-formed bladder 23 is deflated so that it may turn back into deflated pre-formed bladder 21, and then the bladder 21 is removed out from the 3D tube 22. The pre-formed bladder 21 may thus be reused repeatedly. It is obvious that the pre-formed bladder 21 may also be designed for single use.

Figure 6:
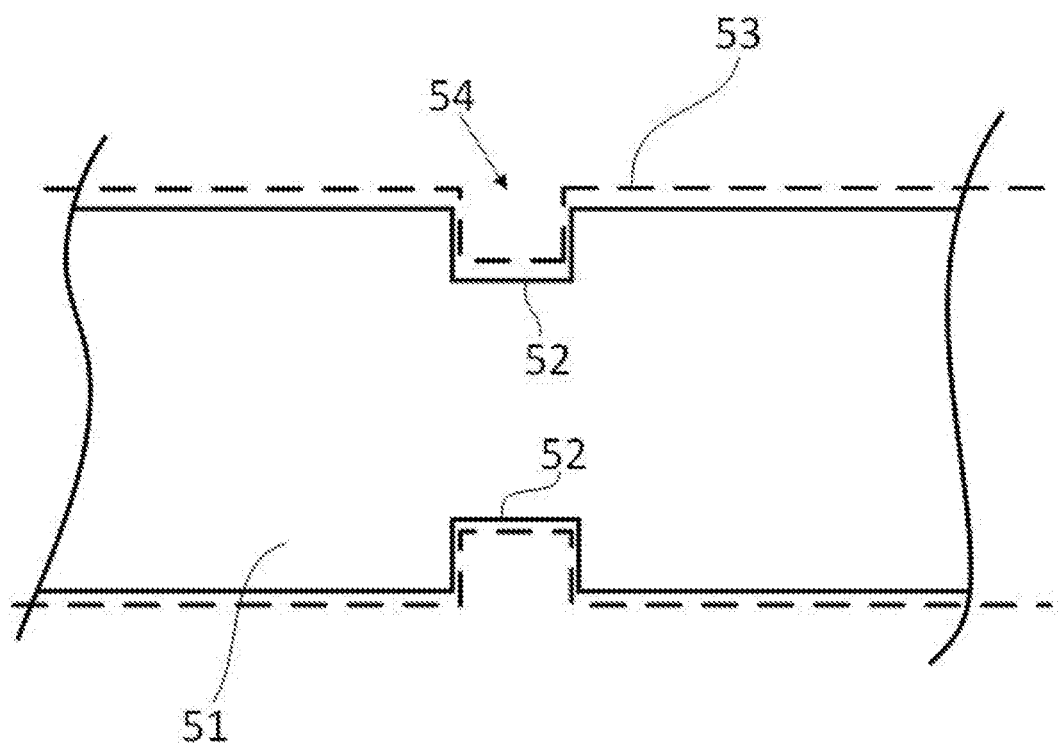
FIG. 6 is a schematic illustration of a bladder with an external feature and a 3D tube according to an exemplary embodiment of the present disclosure.

In some embodiments, after the reforming process of the 3D tube 23, the outside surface of the 3D tube 23 may be carved for marking some features, e.g., serial No. or patent No. In some other embodiments, at least one external feature may be used in combination with the bladder and the at least one external feature may be embossments or concaves, to form some external features, such as some O-ring grooves, on a 3D tube. When the bladder is inflated, an internal pressure force is exerted to the thermoplastic 3D tube and an external tool may be positioned on the outside of the 3D tube to make some external features. FIG. 6 illustrates a part of a bladder 51 with a concave 52. During inflating, the bladder 51 exerts a force to an inner side of an 3D tube 53 (dashed lines), and at the same time, an external tool (not shown) may be poisoned on the external surface of the 3D tube 53 and corresponds to the concave 52 of the bladder 51, which will thus make the 3D tube 53 have the same feature, such as a groove 54, corresponding to the shape of the concave 52 of the bladder. Although FIG. 6 only shows the bladder with a concave external feature, it may be contemplated that a bladder may be with other type of external features, such as an embossment.

Figure 4A:
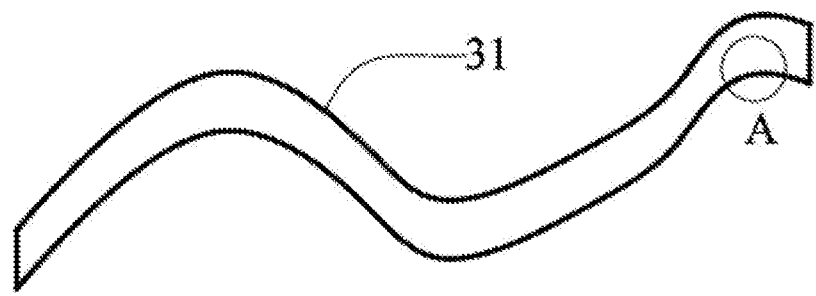
FIG. 4A is a schematic illustration of a final shaped 3D tube with a similar shape of an inflated pre-formed bladder according to an exemplary embodiment of the present disclosure.
Figure 4B:
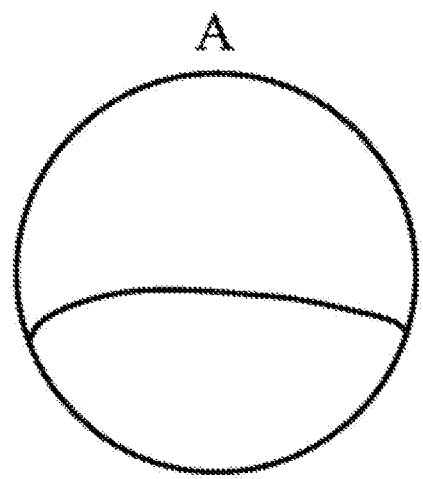
FIG. 4B is an enlarged view of a curved portion of the 3D tube shown in FIG. 4A according to an exemplary embodiment of the present disclosure.

Turning back to FIG. 4A and FIG. 4B, FIG. 4A schematically illustrates a final shaped 3D tube 31 and FIG. 4B schematically illustrates an enlarged view of a curved portion of the final 3D tube 31 shown in FIG. 4A, according to some embodiments of the present disclosure. Unlike traditional techniques, the embodiments of the invention do not utilize mechanical means, instead, utilizing pneumatic pre-formed bladder for bending the linear 3D tube, and thereby buckling may be eliminated in curved portions of the final shaped 3D tube 31. It may be clearly observed in FIG. 3 that the curved portion A of the 3D tube 31 is smooth and continuous, and no buckling appears in the curved portion A.

A final shaped 3D tube described in the above embodiments may be used not only in aircraft, for example, as an aircraft engine tube in a fuel line or an oil line of an aircraft engine, or an air duct forming an air passage of the aircraft, but in any other suitable industrial fields. The 3D tube may be used for guiding any suitable gas or liquid.

The embodiments described above provide a variety of benefits. The above embodiments utilize a tube, for example a thermoplastic tube, and therefore reduce the weight of the final shaped 3D tube. The above embodiments do not require a high infrastructure and installation costs, and thus reduce/minimize the cost for manufacturing a 3D tube. Additionally, the bladder in the embodiments may be reused. Furthermore, buckling of the 3D shape may be eliminated in the embodiments and the final shaped 3D tube may have higher intensity and longer lifespan as compared to those in the prior art.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of reforming a tube, the method comprising:
   inserting a deflated pre-formed bladder into the tube, wherein the tube has an initial tube shape;
   inflating the deflated pre-formed bladder to obtain an inflated pre-formed bladder, the inflated pre-formed bladder deforming the tube to a deformed tube shape that is based on a shape of the inflated pre-formed bladder; and forming an external feature on the tube using an external tool positioned on an external surface of the tube, wherein forming the external feature on the tube using the external tool positioned on the external surface of the tube corresponds to a concave of the inflated pre-formed bladder.

2. The method of claim 1, further comprising:
heating the tube for reforming the tube to reform the tube to the deformed tube shape.

3. The method of claim 2, further comprising:
deflating the inflated pre-formed bladder and removing the deflated pre-formed bladder out from the tube leaving the tube with the deformed tube shape.

4. The method of claim 1, wherein the shape of the inflated pre-formed bladder is irregular or regular.

5. The method of claim 1, wherein the tube is a thermoplastic tube.

6. The method of claim 5, wherein material of the thermoplastic tube is chosen from at least one of: polyethylene, polypropylene, polyetherketone, polyetheretherketone, polyetherketoneketone, polyetherimide, polysulfone, polyphenylsulfone, and polyphenylenesulfone.

7. The method of claim 1, wherein material of the pre-formed bladder is chosen from at least one of: silicone, fluoroelastomer, fluorosilicone, nitrile rubber, EPDM, polyurethane, and teflon.

8. The method of claim 2, wherein the heating the tube for reforming the tube to reform the tube to the deformed tube shape is at a heating temperature ranging from 100 F to 750 F.

9. The method of claim 1, wherein a cross-section shape of the tube comprises: circle, oval, rectangle, trapezoid, triangle, or rhomboid.

10. The method of claim 1, further comprising:
wherein, during inflating the deflated pre-formed bladder, the pre-formed bladder exerting a force to an inner side of the tube.

11. The method of claim 5, further comprising:
heating the tube to a temperature above a glass transition temperature of the thermoplastic material.

12. The method of claim 5, further comprising:
heating the tube to a temperature above a crystallization temperature of the thermoplastic material.

13. A method of reforming a tube, the method comprising:
inserting a deflated pre-formed bladder into the tube, wherein the tube has an initial tube shape;
inflating the deflated pre-formed bladder to obtain an inflated pre-formed bladder and to deform the tube to a deformed tube shape that is based on a shape of the inflated pre-formed bladder; and
heating the tube for reforming the tube to reform the tube to the deformed tube shape, wherein the heating is performed after the inflating.

14. The method of claim 13, wherein the inflated pre-formed bladder is kept inflated during the heating.

* * * * *